Oct. 26, 1954   W. W. HALLINAN   2,692,684
HIGH-PRESSURE FILTER
Filed Jan. 16, 1952
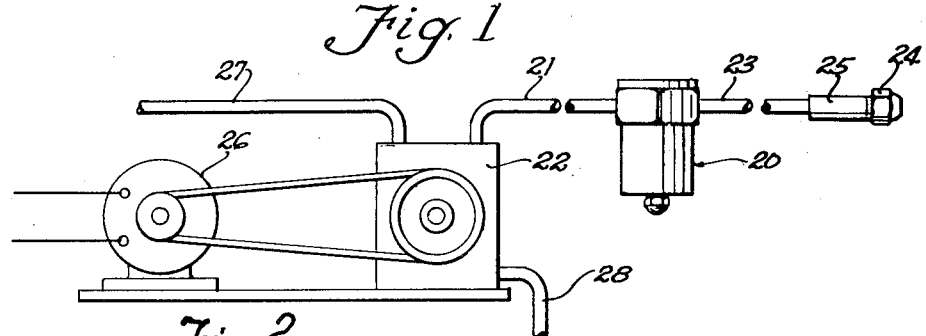
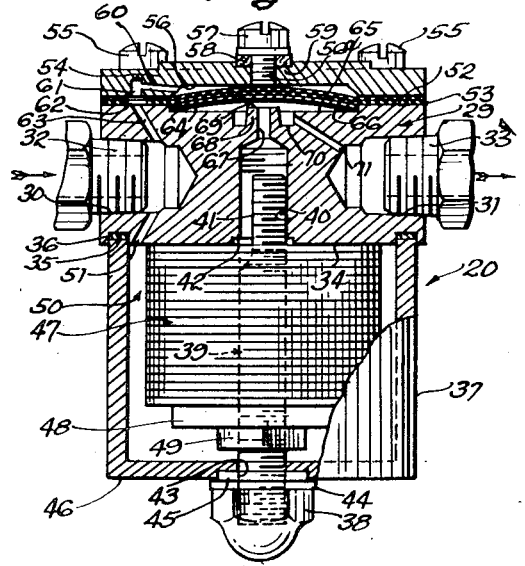
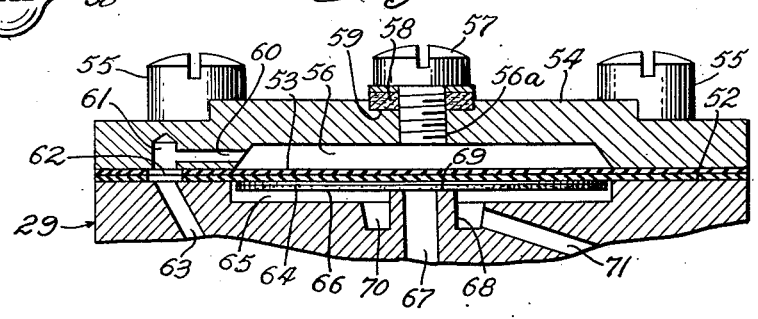
Inventor
William W. Hallinan.
By Robert H. Wendt,
Attorney Patented Oct. 26, 1954

2,692,684

UNITED STATES PATENT OFFICE 2,692,684

HIGH-PRESSURE FILTER

William W. Hallinan, Racine, Wis.

Application January 16, 1952, Serial No. 266,634

5 Claims. (Cl. 210—166)

The present invention relates to high pressure filters, and is particularly concerned with improved filters which are adapted to be used in oil burner assemblies of the nozzle type, between the nozzle and the outlet of the pressure pump, for accomplishing a more efficient filtering action of the liquid fuel when it is used under high pressure.

The present application is a continuation-in-part of my prior application, Ser. No. 107,811, filed July 30, 1949, on High-Pressure Filter, now Patent Number 2,583,423, issued January 22, 1952.

An object of the invention is to build an improved filter which is provided with a simple valve arrangement adapted to cut off the oil supply to the nozzle whenever the oil pressure drops below a safe atomizing pressure. This prevents the nozzle from operating at pressures below the proper atomizing pressure, which would result in an improperly formed flame or the burning back on the nozzle, resulting in destruction of the nozzle and inefficient and sooty combustion conditions.

Another object of the invention is to build an improved filter and control mechanism that will stop the oil flow through the nozzle before the oil pressure becomes too low for complete atomization. As a filter becomes clogged with dirt, the pressure at the nozzle will be reduced, due to the presence of the dirt in the filter, until eventually the pressure will drop below that required for complete atomization. These conditions will cause the flame to burn back on the nozzle, ruining the nozzle, as well as wasting oil and causing sooty combustion, which fills the furnace with soot, due to the smoky and inefficient flames caused at low pressures. The nozzle may also become partly plugged under these conditions.

It is a further object of the invention to provide an improved filter which will positively prevent the supply of oil to a nozzle when the filter is clogged. For example, a pressure drop of ten pounds per square inch across the filter will operate one form of my valve.

Another object is to equip oil burners with an automatic filter and valving device capable of stopping the oil burner before the nozzle is burned or dirty, and which can easily be cleaned by the user of the oil burner without taking the burner apart and without trying to check the nozzle.

Another object is to provide a filter and automatic valve mechanism in which the valve will remain open when the pressure entering the filter from the pump is varied.

Another object is to provide a filter and valve mechanism that will automatically coordinate its combined operation with the existing electric safety control devices on all pressure type oil burners. This valve mechanism accomplishes this function by cutting off the oil supply to the nozzle when the filter core becomes clogged and the filter outlet pressure drops approximately ten pounds per square inch. Naturally, when the oil is cut off from the nozzle, the flame is extinguished; and the electric safety switch then stops the burner.

Other objects and advantages of the invention will be apparent from the following description and the accompanying drawings, in which similar characters of reference indicate similar parts throughout the several views.

Referring to the drawings,

Fig. 1 is a diagrammatic elevational view of the oil burner system embodying the invention, including one of the valved filters of the invention;

Fig. 2 is a fragmentary side elevational view in partial section, showing one of the valved filters used in the system of Fig. 1;

Fig. 3 is an enlarged fragmentary, sectional view showing the diaphragm and snap disc of Fig. 2, with the valve in the closed position.

Referring to Fig. 1, this is a diagrammatic illustration of an ordinary, simple oil burner installation utilizing a valved filter of the type embodying my invention.

In this figure, 20 indicates the valved filter in its entirety; and its inlet is connected by a conduit 21 to the outlet of a fuel pump. The outlet of the valved filter is connected by conduit 23 to the oil burner nozzle 24 through a nozzle filter 25 of the type shown in my prior application. 26 indicates the driving motor; and the inlet to the pump is indicated at 27.

The pump unit 22 may be of the type including a pressure responsive regulator valve, by means of which any excess of fuel is by-passed back to the tank through the conduit 28.

Referring to Fig. 2, this view shows the construction of one of the preferred forms of valved filter 20 embodying my invention. The filter preferably includes a metal base 29, which may be made of cast metal, and which is substantially cylindrical in shape and provided with the threaded inlet opening 30 and threaded outlet opening 31.

Each of these openings has pipe threads for connection to a fitting 32 or 33, by means of which the conduits are connected to the filter. On its lower side the base 29 may have a flat lower surface 34 surrounded by an annular groove 35 of rectangular cross section, for receiving a rubber gasket 36 and for also receiving the upper edge of a cylindrical housing 37.

The housing 37 is secured to the base 29 and clamped against the gasket 36 by means of a cap nut 38, which is threaded on stud bolt 39. Stud bolt 39 is threaded into the threaded bore 40 in the base 29, and comprises a cylindrical metal member threaded at each end.

At the end which is secured in bore 40 the stud bolt is formed with a longitudinally extending groove extending far enough to communicate with an annular groove 42 surrounding the bolt 39 at the flat surface 34. The bolt 39 passes through a central bore 43 in the closed end of the housing 39; and the cap nut preferably engages a metal washer 44 for sliding engagement.

The metal washer 44 engages a rubber washer 45, which surrounds the bolt 39, and is compressed into liquid-tight engagement with the bolt 39. The rubber washer 45 also engages the end 46 of the housing with a liquid-tight engagement, thereby effecting a liquid-tight seal about the opening 43. The bolt 39 also supports an assembly or stack 47 of filter plates.

The specific construction of the filter plates of the stack 47 is no part of the present invention; and the filter element may be of various forms of construction. For example, the filter elements may be substantially as disclosed in my prior patent, above mentioned, which relates to the filter discs; and it is sufficient to say that the filter discs in question receive the liquid to be filtered at their periphery and filter the liquid as it passes between the discs and is discharged at a longitudinally extending conduit surrounding the bolt 39, which may be provided by flattening one side of the bolt. Each filter disc may have a multiplicity of grooves discharging into an annular collection space surrounding the bolt 39.

These filter plates engage the flat surface 34 at one end, and are engaged at the opposite end by the metal pressure plate 48, which consists of a circular disc having an aperture for the bolt 39. The pressure plate 48 is engaged by the nut 49, which holds the filter plates of the assembly 47 in tight engagement with each other and with the flat surface 34.

The assembly 47 of filter plates is a substantially cylindrical body, being composed of circular plates. This assembly is smaller than the inside of the housing 39, thereby providing an annular chamber 50 for receiving the liquid to be filtered. This chamber communicates with the inlet 30 by means of the bore 51 so that liquid coming in the inlet 30 is conducted to the space 50 surrounding the stack of filter plates.

Upon its upper side, in Fig. 2, the base 29 is formed with a flat annular seat 52 for engagement with a resilient diaphragm 53 of natural resilient rubber or oil resisting resilient composition, such as that sold on the market under the name of "Fairprene."

This diaphragm is clamped in place by a metal cover plate 54, which is circular in shape and has a plurality of through apertures for passing the screw bolts 55, which also pass through apertures in the diaphragm 53 and are threaded into threaded bores in the base 29.

The diaphragm thus serves also as a gasket to produce a liquid-tight seal between the cover plate 54 and the base 29. The cover plate 54 is formed with a shallow circular depression 56 for receiving the diaphragm when it bulges upwardly. This depression may communicate with a threaded vent 56a, which is closed by a threaded vent plug 57, such as a screw bolt, which is also sealed by means of a gasket 58 in recess 59.

The shallow recess 56 above the diaphragm is also in communication with the inlet by means of a groove or bore 60, leading from the recess 56 to a bore 61. The bore 61 communicates with an aperture 62 in the diaphragm, which communicates with a bore 63 in the base 29, leading to the inlet 30.

Thus the inlet pressure is also exerted on the top side of the diaphragm. Below the diaphragm 53 there is a metal snap disc 64 in the recess 65. This snap disc is housed in the shallow circular recess 65 formed in the top of the base 29, but is not secured to the diaphragm. Below the metal snap disc 64, and cemented thereto, there is a layer of "Fairprene" or other resilient material 66, which acts as a valve. The diaphragm 53 seals the oil in depression 56 from flowing into the space below the diaphragm and vice versa.

The base 29 has its threaded bore 40 communicating with the recess 65 through a central bore 67. The central bore 67 is surrounded by a tubular portion 68 of the base 29, the end 69 of which forms a valve seat for engagement with the gasket 66. An annular groove 70 surrounds the valve seat and is in communication with the outlet 31 by means of the bore 71.

The lower side of the diaphragm is, therefore, subjected to the pressure of the outlet side of the filter. When the filter is clean, there is no substantial differential between the pressures at its inlet and outlet; but when the filter becomes clogged or dirty, then there is a substantial pressure differential between the inlet and outlet.

Thus, when the filter is dirty, the pressure differential between its inlet and outlet acts on the top of the diaphragm 53, causing it to act upon the snap disc until it snaps from an upwardly concave position, as shown in Fig. 2, to a downwardly concave position, with the gasket 66 engaging seat 69 and closing communication between the inlet and outlet of the filter.

The filter must then be cleaned. Cleaning of the filter may be done by taking it apart and washing its discs and other parts. Upon removal of pressure on the snap disc, it automatically snaps back to its upward position.

It will thus be observed that I have invented an improved filter which is controlled by pressure, and which may utilize any of a plurality of different forms of filter discs. These filter discs may have their filtering apertures so sized that they remove the smallest particles of foreign matter from oil, which might otherwise tend to clog small capacity nozzles.

The flow through the discs may be from the outside inward or from the inside outward, depending upon the arrangement of the housing inlets and outlets.

My filter is preferably provided with an automatic valve which is subjected to the pressure of the oil at the inlet and outlet, and which is controlled by this pressure in such manner that it shuts off the flow through the filter when the filter discs become clogged.

This valve may be controlled by means of a spring pressed piston or by a piston and snap action diaphragm, but preferably consists merely in a snap action diaphragm faced with a resilient covering that engages a seat, because of the simplicity of the latter arrangement.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A valved filter for oil burner fuel systems for cutting off the supply of fuel to the burner upon clogging of the filter, comprising a housing having a liquid fuel inlet and a filtrate outlet to be connected to a burner nozzle, said housing having a filter chamber and a valve chamber separated by a partition, said liquid inlet communicating with said filter chamber, a filter unit fixedly secured in said filter chamber and interposed between the liquid fuel inlet and a conduit extending through said partition to the valve chamber, so that the liquid fuel must pass through the filter unit, said latter conduit having a valve seat surrounding it in the valve chamber, and said conduit communicating through the valve chamber, with a conduit leading to said outlet, a diaphragm in said valve chamber, and separating said valve chamber into two liquid spaces, one liquid space being adjacent said valve seat and subject to outlet fuel pressure, and the other liquid space on the other side of the diaphragm communicating by a conduit with said liquid fuel inlet and subject to inlet liquid pressure, the said diaphragm being actuated by differential between inlet and outlet pressure, which is insufficient to actuate the diaphragm while the filter is clean, but which differential increases with the clogging of said filter, the liquid pressure differential moving said diaphragm into position to close against said valve seat when the filter unit is clogged to a certain extent, requiring cleaning, shutting off the flow of liquid fuel to the outlet and nozzle to indicate the need for filter cleaning, said diaphragm being clamped between a cover plate and the body of said housing, and said valve chamber being recessed to receive the edge of a snap disc biased and bulging away from said valve seat and engaged by said diaphragm to prevent closing of the valve seat except by snap action.

2. A valved filter for oil burner fuel systems for cutting off the supply of fuel to the burner upon clogging of the filter, comprising a housing having a liquid fuel inlet and a filtrate outlet to be connected to a burner nozzle, said housing having a filter chamber and a valve chamber separated by a partition, said liquid inlet communicating with said filter chamber, a filter unit fixedly secured in said filter chamber and interposed between the liquid fuel inlet and a conduit extending through said partition to the valve chamber, so that the liquid fuel must pass through the filter unit, said latter conduit having a valve seat surrounding it in the valve chamber, and said conduit communicating through the valve chamber, with a conduit leading to said outlet, a diaphragm in said valve chamber, and separating said valve chamber into two liquid spaces, one liquid space being adjacent said valve seat and subject to outlet fuel pressure, and the other liquid space on the other side of the diaphragm communicating by a conduit with said liquid fuel inlet and subject to inlet liquid pressure, the said diaphragm being actuated by differential between inlet and outlet pressure, which is insufficient to actuate the diaphragm while the filter is clean, but which differential increases with the clogging of said filter, the liquid pressure differential moving said diaphragm into position to close against said valve seat when the filter unit is clogged to a certain extent, requiring cleaning, shutting off the flow of liquid fuel to the outlet and nozzle to indicate the need for filter cleaning, said diaphragm being clamped between a cover plate and the body of said housing, and said valve chamber being recessed to receive the edge of a snap disc biased and bulging away from said valve seat and engaged by said diaphragm to prevent closing of the valve seat except by snap action, said disc being located between said diaphragm and said valve seat, and said disc having a resilient sealing material adhered thereto for engaging the valve seat.

3. A valved filter for oil burner fuel systems for cutting off the fuel supply to the burner upon clogging of the filter, comprising a metal body provided with an inlet conduit and with an outlet conduit to be connected to the fuel burner, said body being provided on one side with a liquid-tight housing member engaging the body and forming a filter chamber therewith, said housing member being secured to the body by means of a threaded member, a filter unit carried by said threaded member in said filter chamber, and comprising a multiplicity of filter members arranged in a stack to receive liquid at their outer surfaces and to filter it and discharge it to a central conduit adjacent said threaded member, said body having a conduit from its inlet into said filter chamber outside the filter unit, said central conduit extending through said body and terminating in an annular valve seat, a cover plate secured to said body, said cover plate and body being recessed to form a valve chamber, a diaphragm clamped between said cover plate and said body and separating said valve chamber into two spaces for liquid, conduit means extending through said body and cover plate to the space outside said diaphragm for subjecting that side of the diaphragm to inlet liquid pressure, conduit means in said body extending to said outlet from the liquid space on the inside of said diaphragm and communicating with said central conduit through said latter space, subjecting the inside of the diaphragm to outlet liquid pressure, said diaphragm being biased away from said valve seat and remaining in said position while the filter unit is unclogged because the differential of pressure acting on said diaphragm is insufficient to overcome said bias, the clogging of said filter increasing the differential in pressure between the inlet and outlet and acting on the outside of said diaphragm, causing said diaphragm to engage said seat, to shut off the flow of liquid fuel through said outlet to the burner nozzle, to indicate the need of cleaning of the filter.

4. A valved filter for oil burner fuel systems for cutting off the fuel supply to the burner upon clogging of the filter, comprising a metal body provided with an inlet conduit and with an outlet conduit to be connected to the fuel burner, said body being provided on one side with a liquid-tight housing member engaging the body and forming a filter chamber therewith, said housing member being secured to the body by means of a threaded member, a filter unit carried by said threaded member in said filter chamber, and comprising a multiplicity of filter members arranged in a stack to receive liquid at their outer surfaces and to filter it and discharge it to a central conduit adjacent said threaded member, said body having a conduit from its inlet into said filter chamber outside the filter unit, said central conduit extending through said body and terminating in an annular valve seat, a cover plate secured to said body, said cover plate and body being recessed to form a valve chamber, a diaphragm clamped between said cover plate and said body and separating said valve chamber into two spaces for liquid, conduit means extending through said body and cover plate to the space outside said diaphragm for subjecting that side of the diaphragm to inlet liquid pressure, conduit means in said body extending to said outlet from the liquid space on the inside of said diaphragm and communicating with said central conduit through said latter space, subjecting the inside of the diaphragm to outlet liquid pressure, said diaphragm being biased away from said valve seat and remaining in said position while the filter unit is unclogged because the differential of pressure acting on said diaphragm is insufficient to overcome said bias, the clogging of said filter increasing the differential in pressure between the inlet and outlet and acting on the outside of said diaphragm, causing said diaphragm to engage said seat, to shut off the flow of liquid fuel through said outlet to the burner nozzle, to indicate the need of cleaning of the filter, said valve chamber being recessed to receive the edge of a snap disc which is bulging and biased away from said valve seat and engaged by said diaphragm to effect a closure of the valve seat with a snap action at a predetermined pressure differential.

5. A valved filter for oil burner fuel systems for cutting off the fuel supply to the burner upon clogging of the filter, comprising a metal body provided with an inlet conduit and with an outlet conduit to be connected to the fuel burner, said body being provided on one side with a liquid-tight housing member engaging the body and forming a filter chamber therewith, said housing member being secured to the body by means of a threaded member, a filter unit carried by said threaded member in said filter chamber, and comprising a multiplicity of filter members arranged in a stack to receive liquid at their outer surfaces and to filter it and discharge it to a central conduit adjacent said threaded member, said body having a conduit from its inlet into said filter chamber outside the filter unit, said central conduit extending through said body and terminating in an annular valve seat, a cover plate secured to this body, said cover plate and body being recessed to form a valve chamber, a diaphragm clamped between said cover plate and said body and separating said valve chamber into two spaces for liquid, conduit means extending through said body and cover plate to the space outside said diaphragm for subjecting that side of the diaphragm to inlet liquid pressure, conduit means in said body extending to said outlet from the liquid space on the inside of said diaphragm and communicating with said central conduit through said latter space, subjecting the inside of the diaphragm to outlet liquid pressure, said diaphragm being biased away from said valve seat and remaining in said position while the filter unit is unclogged because the differential of pressure acting on said diaphragm is insufficient to overcome said bias, the clogging of said filter increasing the differential in pressure between the inlet and outlet and acting on the outside of said diaphragm, causing said diaphragm to engage said seat, to shut off the flow of liquid fuel through said outlet to the burner nozzle, to indicate the need of cleaning of the filter, said valve chamber being recessed to receive the edge of a snap disc which is bulging and biased away from said valve seat and engaged by said diaphragm to effect a closure of the valve seat with a snap action at a predetermined pressure differential, the said snap disc being located between said diaphragm and said valve seat and being provided on the side toward the valve seat with a layer of resilient sealing material adhered to said snap disc.

References Cited in the file of this patent

UNITED STATES PATENTS

| Number | Name | Date |
| --- | --- | --- |
| 828,657 | Huebner et al. | Aug. 14, 1906 |
| 1,076,128 | Kupferle | Oct. 21, 1913 |
| 1,456,946 | Stork | May 29, 1923 |
| 1,913,401 | Liddell | June 13, 1933 |
| 2,184,761 | Wier | Dec. 26, 1939 |
| 2,404,621 | Davis | July 23, 1946 |
| 2,418,777 | LeClair | Apr. 8, 1947 |
| 2,468,960 | Case | May 3, 1949 |
| 2,583,423 | Hallinan | Jan. 22, 1952 |
| 2,585,863 | Smith | Feb. 12, 1952 |
| 2,588,284 | Otis | Mar. 4, 1952 |
| 2,604,994 | Vocelka | July 29, 1952 |